United States Patent
Trochtchanovitch et al.

(10) Patent No.: US 12,535,682 B2
(45) Date of Patent: Jan. 27, 2026

(54) TRANSMISSIVE OPTICAL ELEMENT BASED ON REFLECTIVE VOLUMETRIC GRATINGS

(71) Applicant: Meta Platforms Technologies, LLC

(72) Inventors: Pavel Trochtchanovitch, Redmond, WA (US); Yusufu Njoni Bamaxam Sulai, Snohomish, WA (US); Zhisheng Yun, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 885 days.

(21) Appl. No.: 17/590,692

(22) Filed: Feb. 1, 2022

(65) Prior Publication Data
US 2023/0221555 A1    Jul. 13, 2023

Related U.S. Application Data

(60) Provisional application No. 63/298,394, filed on Jan. 11, 2022.

(51) Int. Cl.
*G02B 27/01* (2006.01)
(52) U.S. Cl.
CPC .. *G02B 27/0172* (2013.01); *G02B 2027/0178* (2013.01)
(58) Field of Classification Search
CPC .............. G02B 27/017; G02B 27/0172; G02B 2027/0174; G02B 27/0176; G02B 2027/0178
See application file for complete search history.

(56) References Cited

U.S. PATENT DOCUMENTS

| 10,551,616 B2 * | 2/2020 | Wall ........................ G02B 27/30 |
| 2017/0010466 A1 * | 1/2017 | Klug ....................... G02B 26/103 |
| 2018/0082644 A1 * | 3/2018 | Bohn ....................... G02B 6/003 |
| 2018/0164583 A1 * | 6/2018 | Wall .................... G02B 27/1086 |
| 2018/0164627 A1 * | 6/2018 | Oh ...................... G02B 27/0172 |
| 2018/0232048 A1 * | 8/2018 | Popovich ............... G02B 6/105 |

(Continued)

FOREIGN PATENT DOCUMENTS

WO    2020251758 A1    12/2020

OTHER PUBLICATIONS

International Search Report and Written Opinion for International Application No. PCT/US2023/010601 mailed Apr. 13, 2023, 9 pages.

(Continued)

*Primary Examiner* — Bao-Luan Q Le
(74) *Attorney, Agent, or Firm* — Greenberg Traurig, LLP (57) ABSTRACT

A transmissive optical element includes first and second reflective volumetric gratings that redirect an impinging light beam in a first wavelength range from the first grating to the second grating by reflective diffraction, and from the second grating out of the transmissive optical element, also by reflective diffraction. Such a configuration enables the transmissive optical element to transmit a light cone in a second, different wavelength range substantially without redirecting the light cone, while redirecting the impinging light beam at the same time. The transmissive optical element may be used in a visual display e.g. to separate paths of image light in visible part of light spectrum and some service light in a different part of the light spectrum.

20 Claims, 9 Drawing Sheets

(56) References Cited

U.S. PATENT DOCUMENTS

| | | | |
|---|---|---|---|
| 2018/0239177 A1* | 8/2018 | Oh | G02B 5/30 |
| 2018/0252869 A1* | 9/2018 | Ayres | G02B 27/0081 |
| 2018/0275409 A1* | 9/2018 | Gao | G02B 27/0172 |
| 2019/0086674 A1* | 3/2019 | Sinay | G02B 27/0172 |
| 2019/0212557 A1 | 7/2019 | Waldern et al. | |
| 2020/0225479 A1* | 7/2020 | Chi | G02F 1/011 |
| 2021/0041948 A1* | 2/2021 | Berkner-Cieslicki | G06F 3/011 |
| 2021/0191180 A1* | 6/2021 | Malhotra | C08L 67/00 |
| 2021/0208396 A1 | 7/2021 | Li et al. | |
| 2021/0223548 A1 | 7/2021 | Maimone et al. | |
| 2021/0271089 A1* | 9/2021 | Wheelwright | G02B 27/0172 |
| 2021/0294106 A1* | 9/2021 | Meitav | H04N 9/31 |
| 2021/0341743 A1* | 11/2021 | Lam | G02B 6/0016 |
| 2022/0236799 A1* | 7/2022 | Berkner-Cieslicki | G06F 3/011 |
| 2023/0176370 A1* | 6/2023 | He | G02F 1/292 345/8 |

OTHER PUBLICATIONS

International Preliminary Report on Patentability for International Application No. PCT/US2023/010601, mailed Jul. 25, 2024, 8 pages.

\* cited by examiner

TRANSMISSIVE OPTICAL ELEMENT BASED ON REFLECTIVE VOLUMETRIC GRATINGS

REFERENCE TO RELATE APPLICATION

This application claims priority from U.S. Provisional Patent Application No. 63/298,394 entitled "Transmissive Optical Element Based on Reflective Volumetric Gratings", filed on Jan. 11, 2022, and incorporated herein by reference in its entirety.

TECHNICAL FIELD

The present disclosure relates to diffractive optical elements and related optical systems and methods.

BACKGROUND

Diffractive optical elements may deviate, focus or defocus, or disperse light rays into a fan of wavelength component rays. Diffractive optical elements have found a widespread use in such areas as optical test and measurement, holography, remote sensing, imaging, etc. Diffractive elements are also used in visual display systems to focus and redirect light, and disperse light into individual wavelength components.

Visual display systems provide information to viewer(s) including still images, video, data, etc. Visual displays have applications in diverse fields including entertainment, education, engineering, science, training, advertising, to name just a few examples. Some visual displays, such as TV sets, display images to several users, while some visual display systems, such s near-eye displays (NEDs), are intended for use by individual viewers. Most NEDs are wearable on the user's head, and may be self-contained or connected to a controller or a console providing the video feed and/or required control functions.

An artificial reality system may include an NED (e.g., a headset or a pair of glasses) configured to present content to a user. The NED may display virtual objects or combine images of real objects with virtual objects in virtual reality (VR), augmented reality (AR), or mixed reality (MR) applications. For example, in an AR system, a user may view images of virtual objects (e.g., computer-generated images) superimposed with the surrounding environment by seeing through a "combiner" component. The combiner of a wearable display is typically transparent to external light but includes some light routing optic to direct the display light into the user's field of view.

Because a display of HMD or NED is typically worn on the head of a user, a large, bulky, unbalanced, and/or heavy display device would be cumbersome and uncomfortable for the user to wear. Consequently, head-mounted display devices can benefit from a compact and efficient configuration, including efficient light sources and illuminators providing illumination of a display panel, high-throughput ocular lenses, reflectors, diffractive optical elements, and other compact optical elements in the image forming train. The compact optical elements, while being lightweight and convenient to use, may suffer from optical aberrations, image artifacts, rainbowing, ghosting, throughput non-uniformity, and other defects.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Diffraction gratings are used for dispersing light beams by wavelength. Diffraction gratings with spatially varying direction and/or spacing of grooves or fringes may be used for shaping and refocusing monochromatic light beams. Light beams may be deflected, steered, dispersed, reshaped, split, etc. in accordance with the required function of the optical system. Grating structures may be very compact and may be formed on, or supported by other optical elements.

Some types of diffraction gratings, such as volumetric gratings, are direction- and wavelength-selective, and may be used to redirect some light beams while passing through other light beams, depending on the beams angle and wavelength. The wavelength and direction dependence of volumetric gratings provides versatility of beam configuration in accordance with the required function of the optical system.

Volumetric diffraction gratings may be used to separate an optical path of image light of a visual display, i.e. the light path along which a display image is being formed, from some supplemental light path related to operation of the visual display. By way of a non-limiting example, in a near-eye visual display, the optical path of the image light carrying virtual images to be displayed to a user needs to be separated from a light path of an eye tracking system which obtains images of user's eyes in real time, for real-time determination the eyes positions and orientations. To obtain images of the user's eyes, the eyes may be illuminated with auxiliary light invisible to the viewer e.g. infrared light. The light path of the infrared light may need to be separated from the light path of the visible light, i.e. the image light. The two light paths may be separated by a volumetric transmission grating.

The use of volumetric transmission gratings for the purpose of separation of image and service light, also termed auxiliary light, is often hindered by undesired redirection of the image light due to Bragg resonances present in the wavelength range of image light. In accordance with this disclosure, a single volumetric transmission grating may be replaced with a pair of volumetric reflection gratings, which perform the same function as the transmission grating but substantially without unwanted Bragg resonances in the optical spectrum and the field of view of the image light, thereby preserving high quality of the displayed imagery.

In accordance with the present disclosure, there is provided a transmissive optical element for redirecting a light beam in a first wavelength range while transmitting light without redirection by diffraction in a second, different wavelength range and within an angular range. The transmissive optical element comprises a first outer surface for receiving the light beam at a first beam angle; a second outer surface opposing the first outer surface, for outputting the light beam through at a second, different beam angle; a first volumetric grating between the first and second outer surfaces for redirecting, by reflective diffraction, the light beam propagated through the first outer surface; and a second volumetric grating between the first and second outer surfaces for receiving the light beam redirected by the first volumetric grating and for redirecting, by reflective diffraction, the light beam to propagate through the second outer surface and out of the transmissive optical element at the second beam angle.

The first wavelength range may be e.g. an infrared wavelength range comprising wavelengths greater than 710 nm, and the second wavelength range may be a visible wavelength range comprising wavelengths between 390 nm and 710 nm. The first volumetric grating may be disposed proximate the second outer surface, and the second volumetric grating may be disposed proximate the first outer surface. The first and second volumetric gratings may overlap within the transmissive optical element. In visual display applications of the transmissive optical element, the angular range may include a field of view of the visual display, e.g. at least +/−15 degrees in each one of vertical and horizontal directions.

At least one of the first and second volumetric gratings may include at least one of a volumetric Bragg grating or a polarization volumetric hologram grating. At least one of the first and second volumetric gratings may have at least one of a spatially varying pitch or a spatially varying fringe slant angle to provide a spatially varying angle of redirection of the light beam by the transmissive optical element. In some embodiments, the transmissive optical element may include an even number of volumetric gratings including the first and second volumetric gratings, for redirecting the light beam within the transmissive optical element by reflective diffraction.

In accordance with the present disclosure, there is provided a near-eye display comprising a display module for providing image light to an eyebox and the above described transmissive optical element. In embodiments where the near-eye display includes an eye imager for imaging the viewer's eye, the transmissive optical element may be configured to redirect an infrared light beam carrying an image of a viewer's eye at the eyebox to impinge onto the eye imager to detect the image of the viewer's eye. In such embodiments, the first outer surface of the transmissive optical element may face the eyebox. The infrared light beam may include e.g. wavelengths greater than 710 nm, and the image light may be within a wavelength range between 390 nm and 710 nm.

In accordance with the present disclosure, there is further provided a method for imaging a viewer's eye in a near-eye display. The method includes illuminating the viewer's eye with auxiliary light; redirecting the auxiliary light reflected from the viewer's eye using a transmissive optical element of this disclosure in an optical path of image light carrying images to be viewed by the viewer's eye; and detecting the auxiliary light redirected by the transmissive optical element to obtain an image of the viewer's eye. The transmissive optical element may redirect the auxiliary light away from the optical path of the image light. The transmissive optical element may be configured to substantially not deviate or absorb the image light. The image light may provide a field of view of at least +/−15 degrees in each one of vertical and horizontal directions.

Figure 1A:
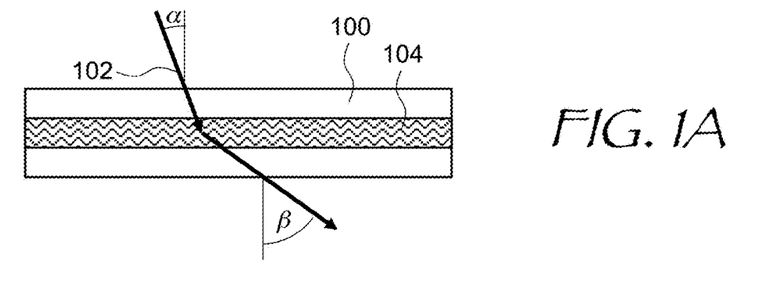
FIG. 1A is a side cross-sectional view of a transmissive optical element based on a volumetric transmissive diffraction grating.

Referring now to FIG. 1A, a transmissive optical element 100 may be used for wavelength-selective redirection of a light beam 102 in a first wavelength range. The transmissive optical element 100 includes a volumetric grating 104 for receiving the light beam 102 at a first beam angle α and for outputting the light beam 102 at a second, different beam angle β.

Figure 1B:
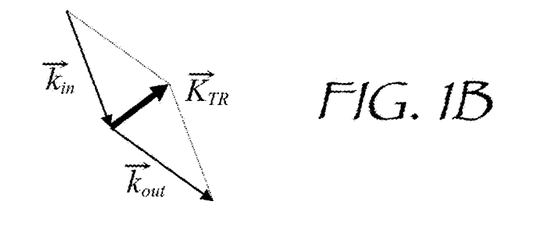
FIG. 1B is a k-vector diagram illustrating the beam deflecting function of the transmissive optical element of FIG. 1A.

FIG. 1B illustrates the process of redirecting the light beam 102 by the volumetric grating 104. An in-coupling k-vector $k_{in}$ represents the light beam 102 prior to impinging onto the volumetric grating 104. An out-coupling k-vector $k_{out}$ represents the light beam 102 after being redirected by the volumetric grating 104. A grating k-vector $K_{TR}$ represents the redirecting action of the volumetric grating 104, which diffracts the light beam 102 by transmissive diffraction. Herein, the term "transmissive diffraction" means that the diffracted beam exits the diffraction grating on the opposite side of the diffraction grating, i.e. it means that the diffracted beam propagated through the grating. Accordingly, an opposite term "reflective diffraction" means that the diffracted beam exits the diffraction grating on the same side side of the diffraction grating, such that the diffracted beam is "reflected" by the grating.

In the example of FIGS. 1A and 1B, the first wavelength range of the light beam 102 may be in the infrared part of the spectrum. The transmissive optical element 100 may be configured to propagate light in a second wavelength range, e.g. in the visible part of the spectrum e.g. from 390 nm to 710 nm, within a cone of incident angles of +/−20 degrees, while deflecting the light beam 102 by a resonant Bragg diffraction, at the wavelength of 850 nm in this example. Herein, a cone of incident angles is termed "field of view" or FOV. Notably, the volumetric grating 104 cannot propagate the visible light beam at all wavelengths within the specified range between 390 nm and 710 nm, and at all beam angles within the specified FOV of +/−20 degrees.

Figure 1C:
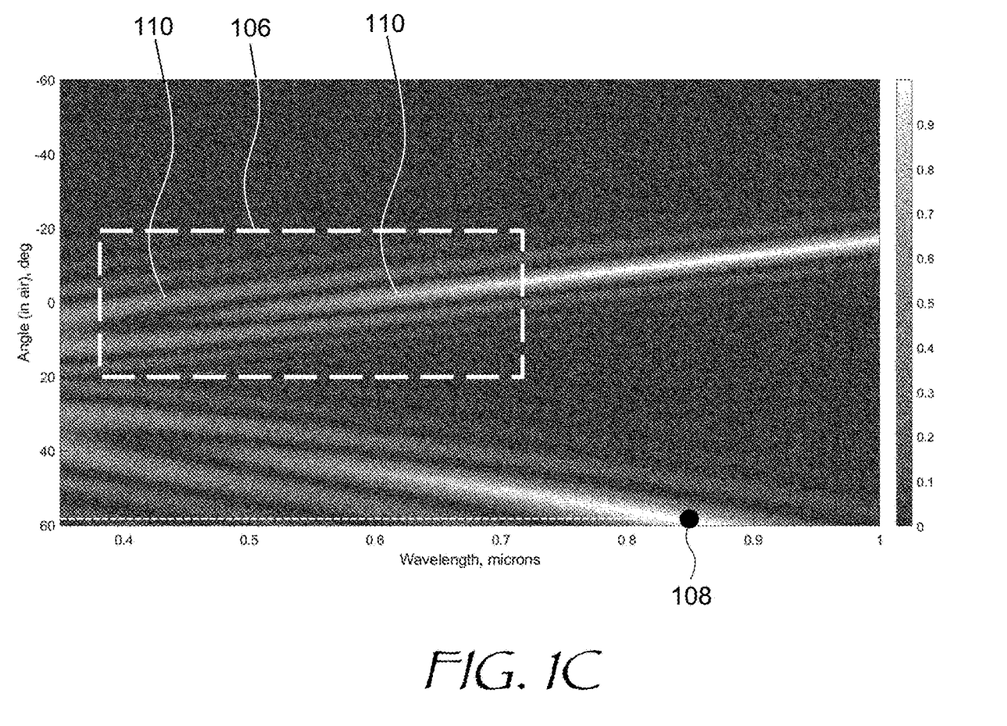
FIG. 1C is a diffraction efficiency map of the volumetric transmissive diffraction grating of FIG. 1A.

This is illustrated in FIG. 1C, where a dashed rectangle 106 denotes the desired range of input angles and wavelengths of the visible light that the transmissive optical element 100 needs to propagate without redirecting while redirecting, by transmissive diffraction, the infrared light beam 102 at an angle of approximately 58 degrees. The wavelength and angle of the light beam 102 redirected by the volumetric grating 104 are denoted by a black circle 108. The dashed rectangle 106 includes Bragg resonance peaks 110 indicating the diffraction of visible light at the wavelengths and incidence angles corresponding to the peaks 110. This unwanted diffraction of the visible light due to Bragg resonances results in selective and colored band-like darkening of the field of view of a display using the transmissive optical element 100, which is undesirable.

Figure 2A:
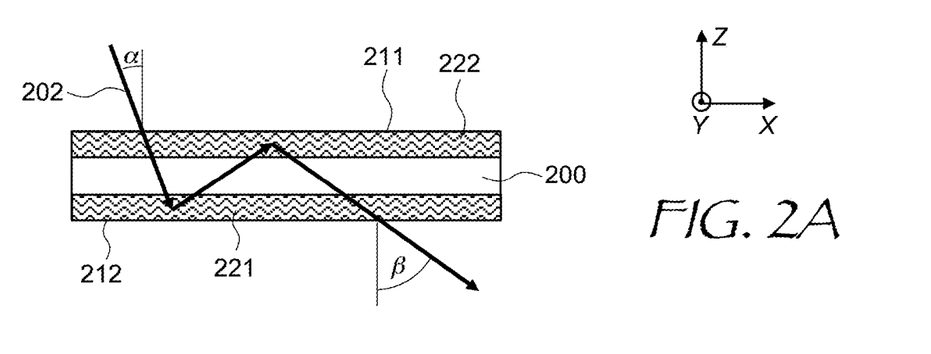
FIG. 2A is a side cross-sectional view of a transmissive optical element based on a pair of volumetric reflective diffraction gratings.

Referring now to FIG. 2A, a transmissive optical element 200 does not have the deficiency of the transmissive optical element 100 of FIG. 1A; at least, the Bragg resonances are considerably suppressed. The transmissive optical element 200 of FIG. 2A includes not one but two volumetric gratings, which operate by reflective diffraction, not transmissive diffraction. The transmissive optical element 200 has first and second opposed outer surfaces 211 and 212, respectively. The transmissive optical element 200 may be based on a slab of transparent material, for example. The slab does not need to be straight, i.e. the slab may be curved if required by a specific optical configuration.

The first outer surface 211 receives the light beam 102 in the first wavelength range at an in-coupling beam angle α. The beam angles of the light beam 102 may be referenced to the outer surfaces 211, 212 as illustrated, or to an external XYZ coordinate system, e.g. the XY plane. The second outer surface 212 outputs the light beam 102 at a second beam angle β different from the in-coupling beam angle α. Thus, the transmissive optical element 200 redirects or deviates the light beam 102. The term "transmissive" implies that the light beam 102 exits the transmissive optical element 200 on its opposite side, i.e. the second side 212, at an out-coupling beam angle β.

To provide the required wavelength-selective beam redirecting function, the transmissive optical element 200 includes a first volumetric grating 221 between the first 211 and second 212 outer surfaces and adjacent the second outer surface 212 for redirecting, by reflective diffraction, a light beam 202 propagated through the first outer surface 211. The transmissive optical element 200 further includes a second volumetric grating 222 disposed between the first 211 and second 212 outer surfaces adjacent the first outer surface 211 for receiving the light beam 202 redirected by the first volumetric grating 221 and for redirecting, by reflective diffraction, the light beam 202 to propagate through the second outer surface 212 and out of the transmissive optical element 200 at the out-coupling beam angle β. The first 221 and second 222 volumetric gratings may be e.g. volume Bragg gratings (VBGs) or polarization volume hologram (PVH) gratings. VBG and PVH grating examples will be given further below.

Figure 2B:
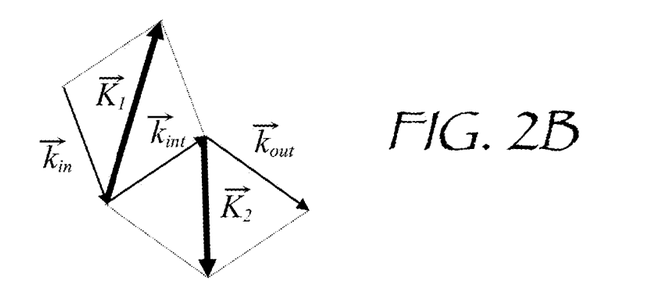
FIG. 2B is a k-vector diagram illustrating a beam deflecting function of the transmissive optical element of FIG. 2A.

Referring to FIG. 1B, the impinging light beam 202 is represented by an in-coupling k-vector $k_{in}$. The action of the first volumetric grating 221 onto the impinging light beam 202 is represented by a first grating vector $K_1$, which redirects the light beam 202 from the first volumetric grating 221 to the second volumetric grating 222. The redirected light beam 202 is represented by an intermediate k-vector $k_{int}$. The action of the second volumetric grating 222 onto the redirected light beam 202 is represented by a second grating vector $K_2$, which out-couples the light beam from the transmissive optical element 200. The out-coupled light beam 202 is represented by an out-coupling k-vector $k_{out}$.

Figure 2C:
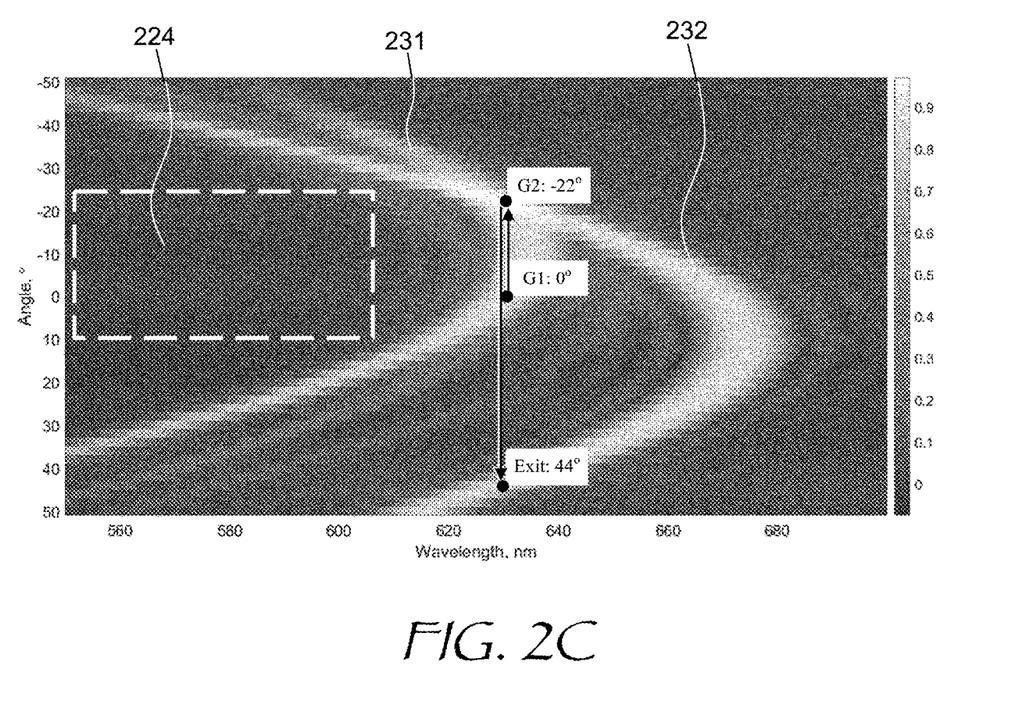
FIG. 2C shows diffraction efficiency map of the volumetric reflective diffraction gratings of the transmissive optical element of FIG. 2A.

The wavelength-selective operation of the transmissive optical element 200 is illustrated in FIG. 2C, which is a map of experimentally measured dispersion of a pair of volumetric diffraction gratings operating in reflective configuration, i.e. by reflective diffraction. The measured Bragg resonance of the first volumetric grating 221 is represented by a first white arc 231, and the measured Bragg resonance of the second volumetric grating 222 is represented by a second white arc 232. The vertical axis in FIG. 2C denotes beam angles before refraction. The first 231 and second 232 arcs are cosine functions of incident angle after refraction, with the peak corresponding to the slant angle of the grating's volumetric fringes in Littrow configuration, i.e. a configuration when the angle of incidence is equal to the angle of reflective diffraction. The horizontal position of the peak, i.e. the wavelength of the peak corresponds to the pitch of the grating's volumetric fringes.

In the illustrative example of FIG. 2C, the light beam 202 is at the wavelength of 633 nm. The light beam 202 impinges onto the first volumetric grating 221 at the incidence angle α of 0 degrees, as marked with a central black dot G1. The first volumetric grating 221 reflectively diffracts the light beam to a top black dot G2, which is symmetrically positioned on the first arc 231 w.r.t. the central black dot G1. The light beam 202 then impinges onto the second volumetric grating 222 at the angle of incidence of −22 degrees. The second volumetric grating 222 reflectively diffracts the light beam 202 at an angle β of 44 degrees, as marked with the bottom dot black G3. The bottom black dot G3 is symmetrically positioned on the second arc 232 w.r.t. the top black dot G2. It is seen that a FOV portion and a wavelength range represented by a dashed white rectangle 224 is substantially free of any Bragg resonances. Therefore, image light in the wavelength range between 550 nm and 610 nm (i.e. the second wavelength range) will propagate through the transmissive optical element 200 of FIG. 2A substantially without attenuation caused by Bragg resonances. In some embodiments, the FOV is at least +/−15 degrees in each one of vertical and horizontal directions, and/or is at least +/−30 degrees in one direction. The Bragg resonance free wavelength range may cover entire visible wavelength range comprising wavelengths between 390 nm and 710 nm. The infrared range of the optical beam 202 may include wavelengths greater than 710 nm.

The transmissive optical element 200 of FIG. 2A may be used in any application where a wavelength-selective separation of light paths is required. One such application is a visual display application where an optical path of image light in a visible wavelength range and angular range corresponding the FOV of the display needs to be separated from an optical path of some service light, or auxiliary light, typically in the infrared wavelength range. The auxiliary light may be used e.g. to illuminate the viewer's eyes and/or to obtain images of the viewer's eyes, from which a gaze direction and eye vergence may be determined. The latter may be used to overcome vergence-accommodation conflict that is one of biggest detrimental effects of most 3D television sets.

Figure 3:
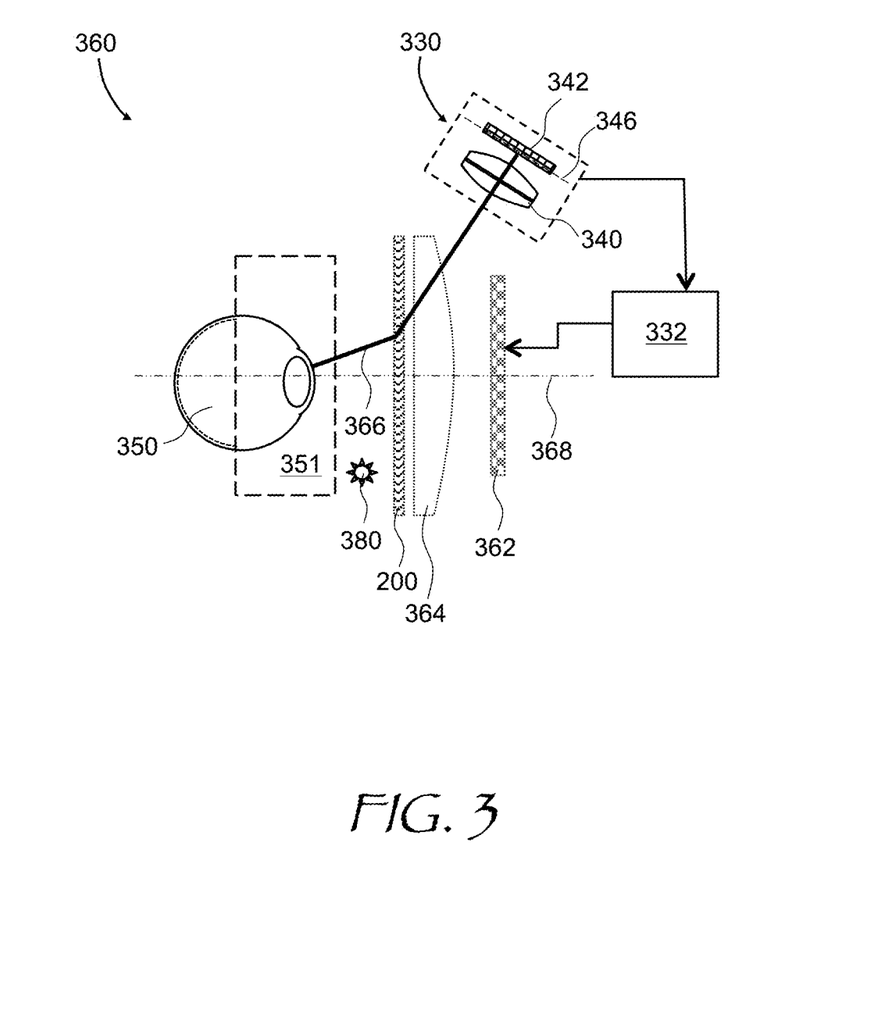
FIG. 3 is a schematic view of a near-eye display using the transmissive optical element of FIG. 2A to redirect an auxiliary light beam carrying an image of an eye of the display's user away from an optical axis of the display and towards an eye imaging system.

A transmissive optical element of this disclosure may be used to route light paths in a visual display. Referring to FIG. 3 for a non-limiting illustrative example, a near-eye display (NED) 360 includes a display panel 362 coupled to a near-eye optic 364. Together, the display panel 362 and the near-eye optic 364 form a display module that projects images generated by the display panel 362 to the viewer's eye 350 through the near-eye optic 364. The purpose of the near-eye optic 364 is to convert an image in linear domain provided by the display panel into an image in angular domain for direct observation by the eye 350 placed at an eyebox 351. The near-eye optic 364 may include e.g. a refractive lens, a pancake lens, a curved reflector, a polarization optic, etc.

The NED 360 may further include an eye imager 330 for imaging the viewer's eye 350. The images of the eye 350 may be obtained in real time for the purpose of real-time tracking the eye's 350 position and orientation in the eyebox 351. A feedback based on the eye's 350 position and/or orientation may be provided to a display controller 332. The display controller 332 may adjust the near-eye optic 364 and/or the image displayed by the display panel 362 depending on the eye position and orientation determined by the eye imager 330 to improve image quality, to alleviate vergence/accommodation conflict, to interact with the user of the NED 360, and so on.

The NED 360 may further include a light source 380. The light source 380 may emit infrared light to avoid viewer's distraction and/or make the illumination of the eye inconspicuous to the viewer. The transmissive optical element 200 of FIG. 2B may be used in the NED 360 for redirecting infrared light emitted by the light source 380 and reflected from the eye 350 to impinge on the eye imager 330. The infrared light redirected or deflected by the optical element 200 propagates off-axis, i.e. away from an optical axis 368 of the near-eye optic 364. An optical path 366 of the deflected light is illustrated with a thick black line. The infrared rays downstream of the transmissive optical element 200 form acute angles with the optical axis 368.

The eye imager 330 includes an objective 340 at the distal end of the optical path 366. The objective 340 is coupled to a photodetector array 342 disposed in a focal plane 346 of the objective 340. The objective 340 forms an image of the eye at the focal plane 346. The photodetector array 342 detects the image of the eye 350 formed by the objective 340. The image may then be used for eye tracking purposes as explained above. It is to be noted that the NED 360 environment is only one non-limiting example of application of the transmissive optical element 200, or any of its variants disclosed herein. The transmissive optical element 200 of FIG. 2A, or any of its variants, may be used in any situation where off-axis imaging is needed.

Figure 4:
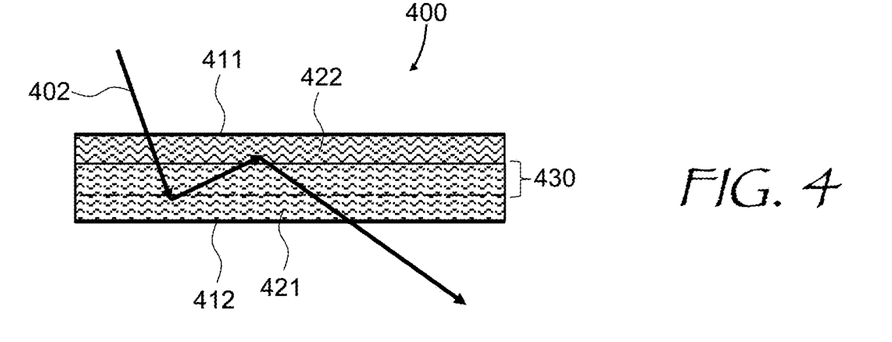
FIG. 4 is a side cross-sectional view of a variant of the transmissive optical element of FIG. 2A with overlapping gratings.

Referring to FIG. 4 with further reference to FIG. 2A, a transmissive optical element 400 is similar to the transmissive optical element 200 of FIG. 2A, and operates in a similar manner. The transmissive optical element 400 of FIG. 4 includes first 421 and second 422 volumetric gratings disposed within the transmissive optical element 400 between its first 411 and second 412 surfaces. The first 421 and second 422 volumetric gratings operate similarly to the first 221 and second 222 volumetric gratings of the transmissive optical element 200 of FIG. 2A. Briefly, a light beam 402 is redirected by the first volumetric grating 421 by reflective diffraction to impinge onto the second volumetric grating 422, which redirects the light beam 402 by reflective diffraction to propagate out of the transmissive optical element 400. The first 421 and second 422 volumetric gratings overlap within the transmissive optical element 400, forming an overlap area 430. In some embodiments, the first 421 and second 422 volumetric gratings may fully overlap within the transmissive optical element 400.

Figure 5:
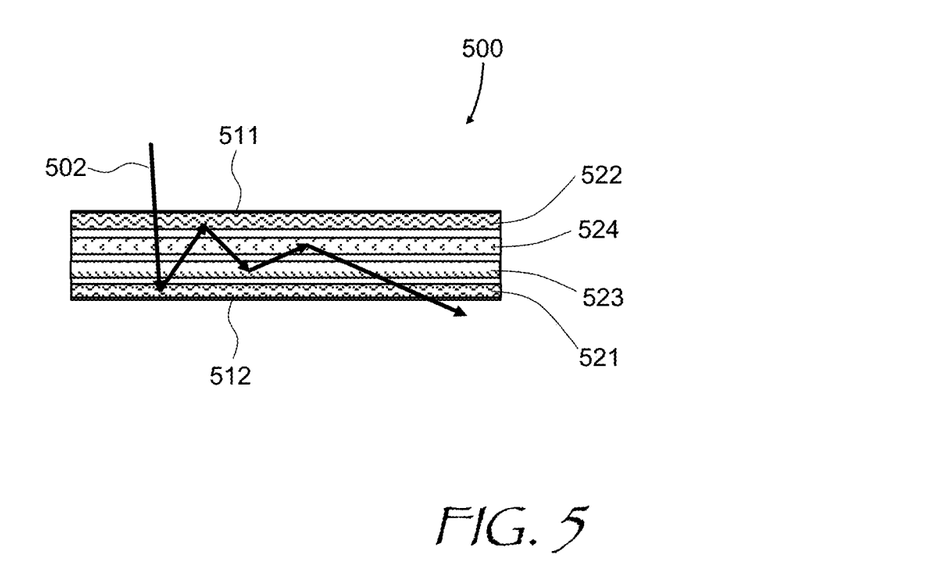
FIG. 5 is a side cross-sectional view of a variant of the transmissive optical element of FIG. 2A with four gratings.

Turning to FIG. 5 with further reference to FIG. 2A, a transmissive optical element 500 is similar to the transmissive optical element 200 of FIG. 2A, and operates in a similar manner. The transmissive optical element 500 of FIG. 5 includes first 521, second 522, third 523, and fourth 524 volumetric gratings disposed within the transmissive optical element 500 between its first 511 and second 512 surfaces. The first 521 and second 522 volumetric gratings operate in a similar manner as the first 221 and second 222 volumetric gratings of the transmissive optical element 200 of FIG. 2A. Briefly, a light beam 502 is redirected by the first volumetric grating 521 by reflective diffraction to impinge onto the second volumetric grating 522, which redirects the light beam 502 by reflective diffraction to impinge onto the third volumetric grating 523, which redirects the light beam 502 by reflective diffraction to impinge onto the fourth volumetric grating 524. Providing four reflective volumetric gratings, or more generally an even number of volumetric gratings, in any order, gives one more degrees of freedom to redirect the impinging light beam.

Figure 6:
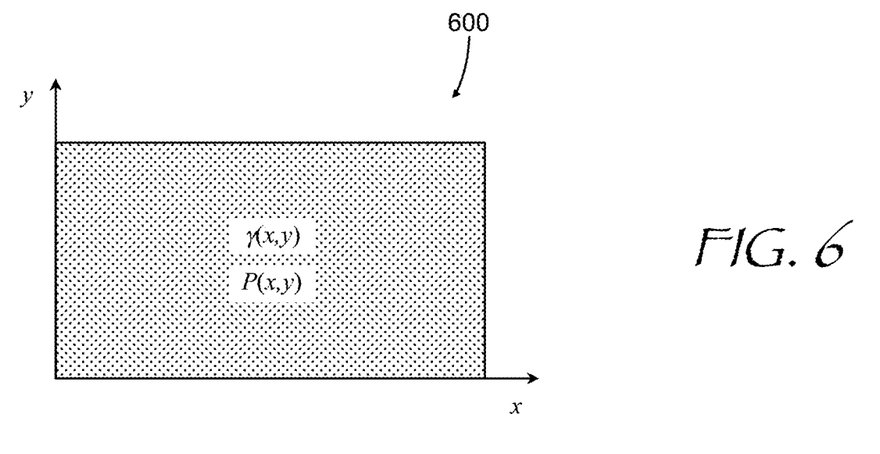
FIG. 6 is a plan view of a transmissive optical element with spatially varying redirecting angle.

Referring now to FIG. 6 with further reference to FIG. 2A, a transmissive optical element 600 is similar to the transmissive optical element 200 of FIG. 2A, and operates in a similar manner. The transmissive optical element 600 of FIG. 6 also includes a pair, or more generally an even number, of reflective volumetric gratings that redirect an impinging light beam similarly to the transmission element 200 of FIG. 2A. One difference of the transmissive optical element 600 of FIG. 6 is that at least one of the volumetric gratings has at least one of a spatially varying pitch P(x,y) or a spatially varying fringe slant angle γ(x,y) to provide a spatially varying angle of redirection of the light beam by the transmissive optical element 600. The spatially varying pitch P(x,y) and/or fringe slant angle γ(x,y) of at least one of the reflective volumetric gratings enable the construction of any transmissive optical element such as for example a lens, a corrector plate, to bend the rays as required for the element's intended function. For example, a lens element based on the transmissive optical element 600 may have a deviation angle of the beam monotonically increasing with a radial distance from a center of the lens. The slant angle γ(x,y) may be measured e.g. relative to one of the outer surfaces that receive or transmit a light beam, such as, for example, the first 211 or second 212 outers surfaces of the transmission optical element 200 of FIG. 2.

Figure 7:
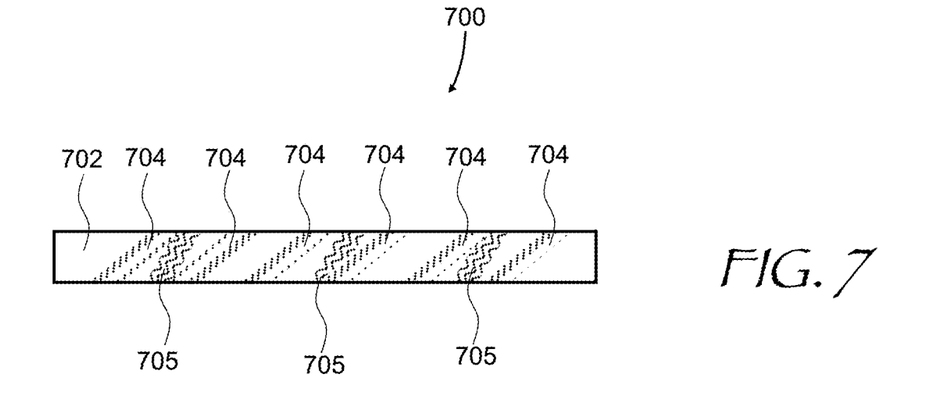
FIG. 7 is a side cross-sectional view of a volume Bragg grating (VBG) usable in a transmissive optical element of this disclosure such as the transmissive optical element of FIG. 2A, and in the near-eye display of FIG. 3.

Referring to FIG. 7, a volume Bragg grating (VBG) 700 may be used as the first 221 and/or second 222 volumetric grating, or as both the first 221 and second 222 volumetric gratings in the optical transmission element 200 of FIG. 2A and the NED 360 of FIG. 3. The VBG 700 includes a substrate 702 of a first refractive index, e.g. a transparent slab of glass, plastic, polymer, etc., and a first plurality of slanted fringes 704 in the substrate 702. The slanted fringes 704 have a second refractive index different from the first refractive index. The period or pitch of the slanted fringes 704 and the slant angle relative to a plane of the substrate 702 are selected to diffract light beams of certain direction or beam angle and a wavelength. All other beams will propagate through the substrate without deviation.

The VBG 700 may further include a second plurality of slanted fringes 705 interspersed with the slanted fringes 704 of the first plurality, at their own slant angle. By providing multiple pluralities or arrays of fringes, each array diffracting a light beam component at a certain angle and wavelength, a desired optical performance of the VBG 700 may be achieved. For example, when the slanted fringes 704 and 705 are configured to deflect the light beams at two different wavelengths, independently controllable performance of the VBG 700 at the two wavelengths is possible. In other embodiments, the first volumetric grating 221 may include the first plurality of slanted fringes 704, and the second volumetric grating 222 may include the second plurality of slanted fringes 705.

Figure 8A:
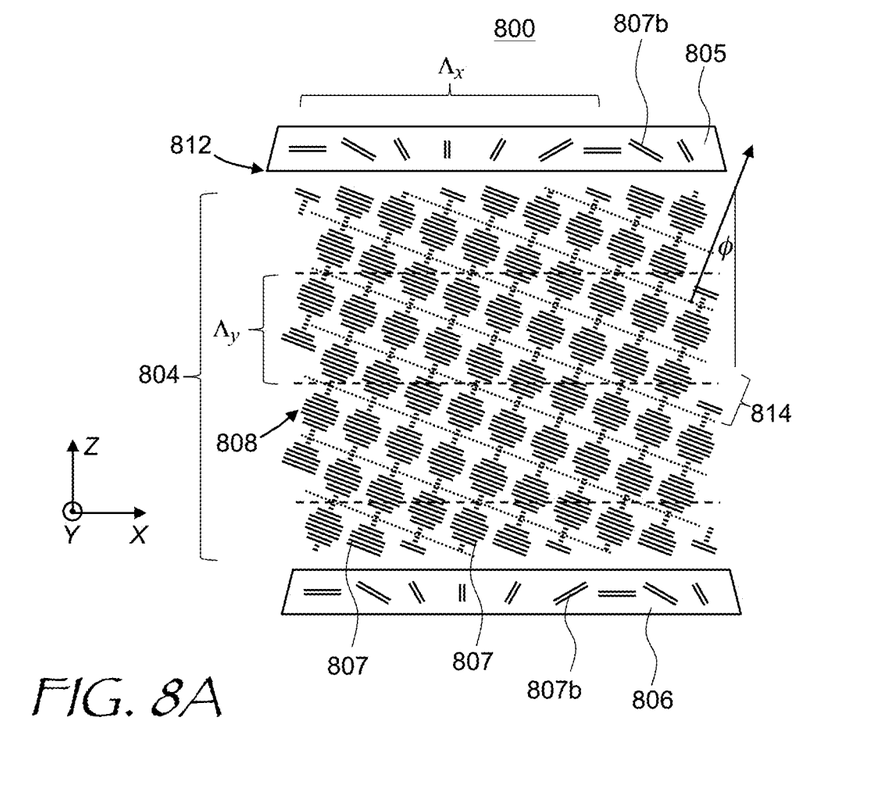
FIG. 8A is a side cross-sectional view of a polarization volume hologram (PVH) grating usable in a transmissive optical element of this disclosure such as the transmissive optical element of FIG. 2A, and in the near-eye display of FIG. 3.
Figure 8B:
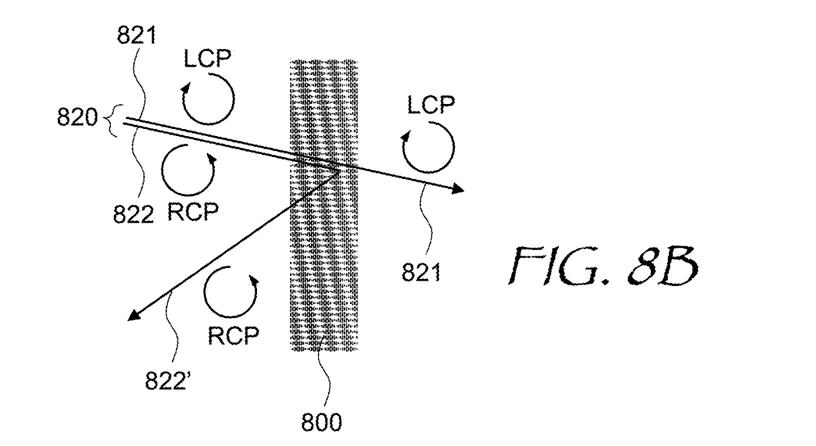
FIG. 8B is a diagram illustrating optical performance of the PVH grating of FIG. 8A.

Turning to FIGS. 8A and 8B, a polarization volume hologram (PVH) grating 800 may be used as the first 221 and/or second 222 volumetric grating in the optical transmission element 200 of FIG. 2A and the NED 360 of FIG. 3. The PVH grating 800 of FIG. 8 includes a liquid crystal (LC) layer 804 bound by opposed top 805 and bottom 806 parallel surfaces. The LC layer 804 may include liquid crystals containing rod-like molecules 807 with positive dielectric anisotropy, e.g. nematic LC molecules. A chiral dopant may be added to the LC material, causing the LC molecules in the LC material to self-organize into a periodic helical configuration including helical structures 808 extending between the top 805 and bottom 806 parallel surfaces of the LC layer 804. Such a configuration of the LC molecules 807, termed herein a cholesteric configuration, includes a plurality of helical periods p, e.g. at least two, at least five, at least ten, at least twenty, or at least fifty helical periods p between the top 805 and bottom 806 parallel surfaces of the LC layer 804.

Boundary LC molecules 807b at the top surface 805 of the LC layer 804 may be oriented at an angle to the top surface 805. The boundary LC molecules 807b may have a spatially varying azimuthal angle, e.g. linearly varying along X-axis parallel to the top surface 805, as shown in FIG. 8A. To that end, an alignment layer 812 may be provided at the top surface 805 of the LC layer 804. The alignment layer 812 may be configured to provide the desired orientation pattern of the boundary LC molecules 807b, such as the linear dependence of the azimuthal angle on the X-coordinate. A pattern of spatially varying polarization directions of the UV light may be selected to match a desired orientation pattern of the boundary LC molecules 807b at the top surface 805 and/or the bottom surface 806 of the LC layer 804. When the alignment layer 812 is coated with the cholesteric LC material, the boundary LC molecules 807b are oriented along the photopolymerized chains of the alignment layer 812, thus adopting the desired surface orientation pattern. Adjacent LC molecules adopt helical patterns extending from the top 805 to the bottom 806 surfaces of the LC layer 804, as shown.

The boundary LC molecules 807b define relative phases of the helical structures 808 having the helical period p. The helical structures 808 form a volumetric grating comprising helical fringes 814 tilted at an angle φ, as shown in FIG. 8A. The steepness of the tilt angle φ depends on the rate of variation of the azimuthal angle of the boundary LC molecules 807b at the top surface 805 and p. Thus, the tilt angle φ is determined by the surface alignment pattern of the boundary LC molecules 807b at the alignment layer 812. The volumetric grating has a period $\Lambda_x$ along X-axis and $\Lambda_y$ along Y-axis. In some embodiments, the periodic helical structures 808 of the LC molecules 807 may be polymer-stabilized by mixing in a stabilizing polymer into the LC fluid, and curing (polymerizing) the stabilizing polymer.

The helical nature of the fringes 814 makes the PVH grating 800 preferably responsive to light of polarization having one particular handedness, e.g. left- or right-circular polarization, while being substantially non-responsive to light of the opposite handedness of polarization. Thus, the helical fringes 814 make the PVH grating 800 polarization-selective, causing the PVH grating 800 to diffract light of only one handedness of circular polarization. This is illustrated in FIG. 8B, which shows a light beam 820 impinging onto the PVH grating 800. The light beam 820 includes a left circular polarized (LCP) beam component 821 and a right circular polarized (RCP) beam component 822. The LCP beam component 821 propagates through the PVH grating 800 substantially without diffraction. Herein, the term "substantially without diffraction" means that, even though an insignificant portion of the beam (the LCP beam component 821 in this case) might diffract, the portion of the diffracted light energy is so small that it substantially does not impact the intended performance of the PVH grating 800. The RCP beam component 822 of the light beam 820 undergoes reflective diffraction, producing a diffracted beam 822'. The polarization selectivity of the PVH grating 800 results from the effective refractive index of the grating being dependent on the relationship between the handedness, or chirality, of the impinging light beam and the handedness, or chirality, of the grating fringes 814. It is further noted that sensitivity of the PVH 800 to right circular polarized light in particular is only meant as an illustrative example. When handedness of the helical fringes 814 is reversed, the PVH 800 may be made sensitive to left circular polarized light.

Figure 9:
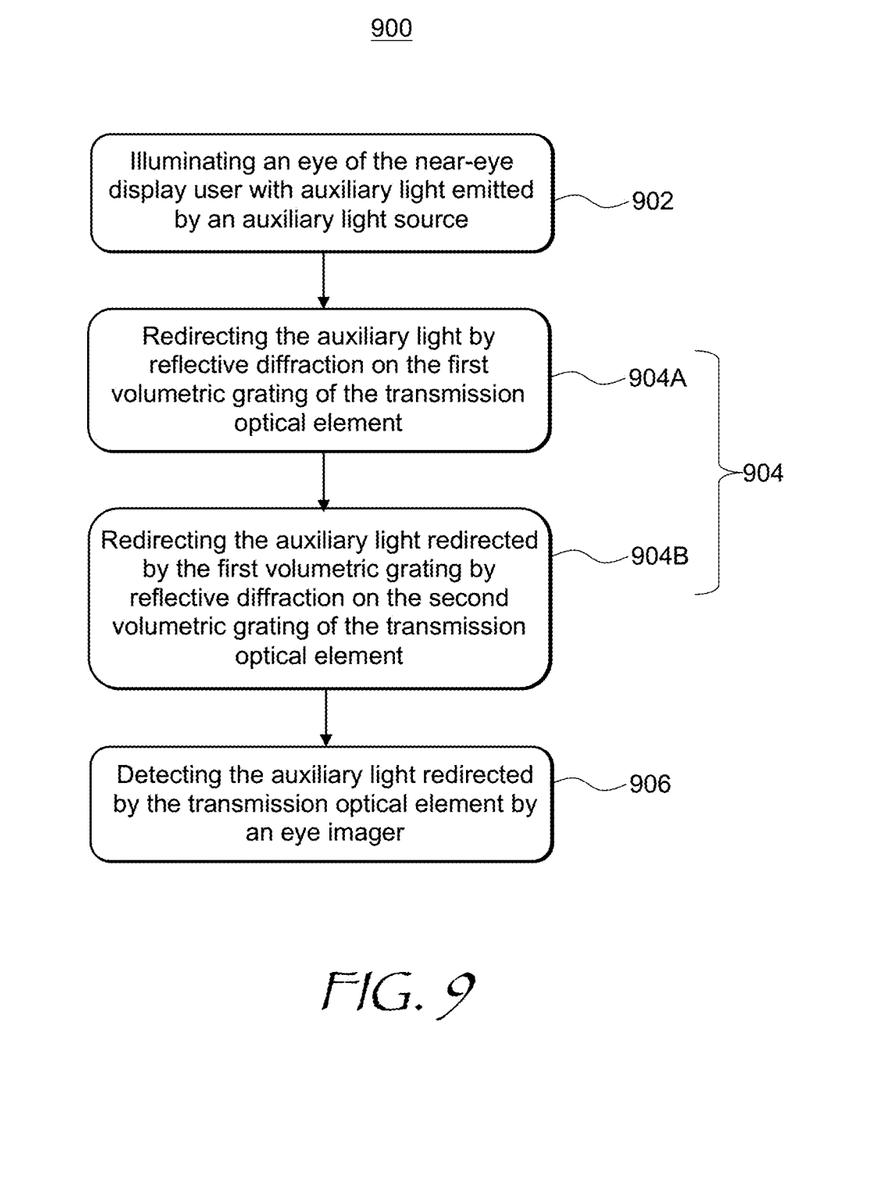
FIG. 9 is a flow chart of a method for imaging a viewer's eye in a near-eye display.

Referring now to FIG. 9 with further reference to FIGS. 2A and 3, a method 900 for imaging a viewer's eye in a near-eye display, e.g. the NED 300 of FIG. 3, is presented. The method 900 includes illuminating (902) the viewer's eye with auxiliary light, e.g. illuminating the eye 350 using the light source 380 emitting infrared light (FIG. 3). The auxiliary light emitted by the light source 380 and reflected from the viewer's eye 350 is redirected (FIG. 9; 904) using a transmissive optical element of this disclosure, e.g. the transmissive optical element 200 of FIG. 2A. The transmissive optical element is placed in an optical path of image light carrying images to be viewed by the user of the NED. The redirecting 904 may include redirecting (904A) the auxiliary light by reflective diffraction on a first volumetric grating of the transmissive optical element, e.g. the first volumetric grating 221 o FIG. 2A, and redirecting (904B) the auxiliary light redirected by the first volumetric grating by reflective diffraction on a second volumetric grating of the transmissive optical element, e.g. the second volumetric grating 222, to exit the transmissive optical element. The auxiliary light redirected by the transmissive optical element is then detected (906), e.g. by using the eye imager 330 of FIG. 3, to obtain an image of the viewer's eye.

As explained above with reference to FIG. 3, the transmissive optical element may redirect the auxiliary light away from the optical path of the image light, enabling the eye imager 330 to be suitably placed away from the image-forming near-eye optic 364. The image light may provide a field of view of at least +/−15 degrees in each one of vertical and horizontal directions, or at least +/−30 degrees in some embodiments, without significant image alterations or distortions by the transmissive optical element of the near-eye display.

Figure 10:
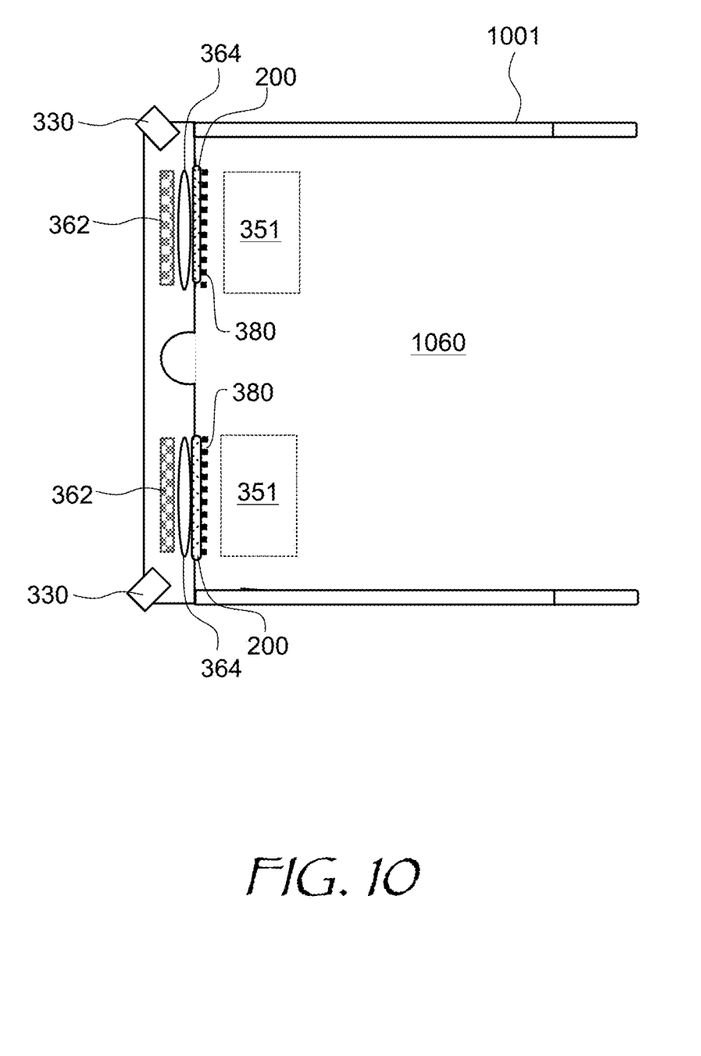
FIG. 10 is a view of an augmented reality (AR) display of this disclosure having a form factor of a pair of eyeglasses.

Referring to FIG. 10 with further reference to FIG. 3, a virtual reality (VR) NED 1060 is an implementation of the NED 360 of FIG. 3, and includes elements of the NED 360. The VR NED 1060 of FIG. 10 includes a frame 1001 supporting, for each eye: the display panel 362 having an array of display pixels, and the near-eye optic (ocular lens) 364 for converting the image in linear domain generated by the display panel 362 into an image in angular domain for direct observation by an eye at the eyebox 351. A plurality of infrared polychromatic light sources 380, shown as black dots, may be placed around the eyebox 351 on a nearest surface that faces the eyebox 351. The eye imager 330 includes an objective and a photodetector array as explained above with reference to FIG. 3. The pair of the reflective volumetric gratings 221, 222 is used to reroute the optical path of the eye imager 330 away from the optical axis of the near-eye optic 364.

The purpose of the eye imagers 330 is to determine position and/or orientation of both eyes of the user. The infrared light sources 380 illuminate the eyes at the corresponding eyeboxes 351, allowing the eye imagers 330 to obtain the images of the eyes, as well as to provide reference reflections of the infrared polychromatic light sources 380, termed glints. The glints may function as reference points in the captured eye image, facilitating the eye gazing direction determination by determining position of the eye pupil images relative to the glints images.

Figure 11:
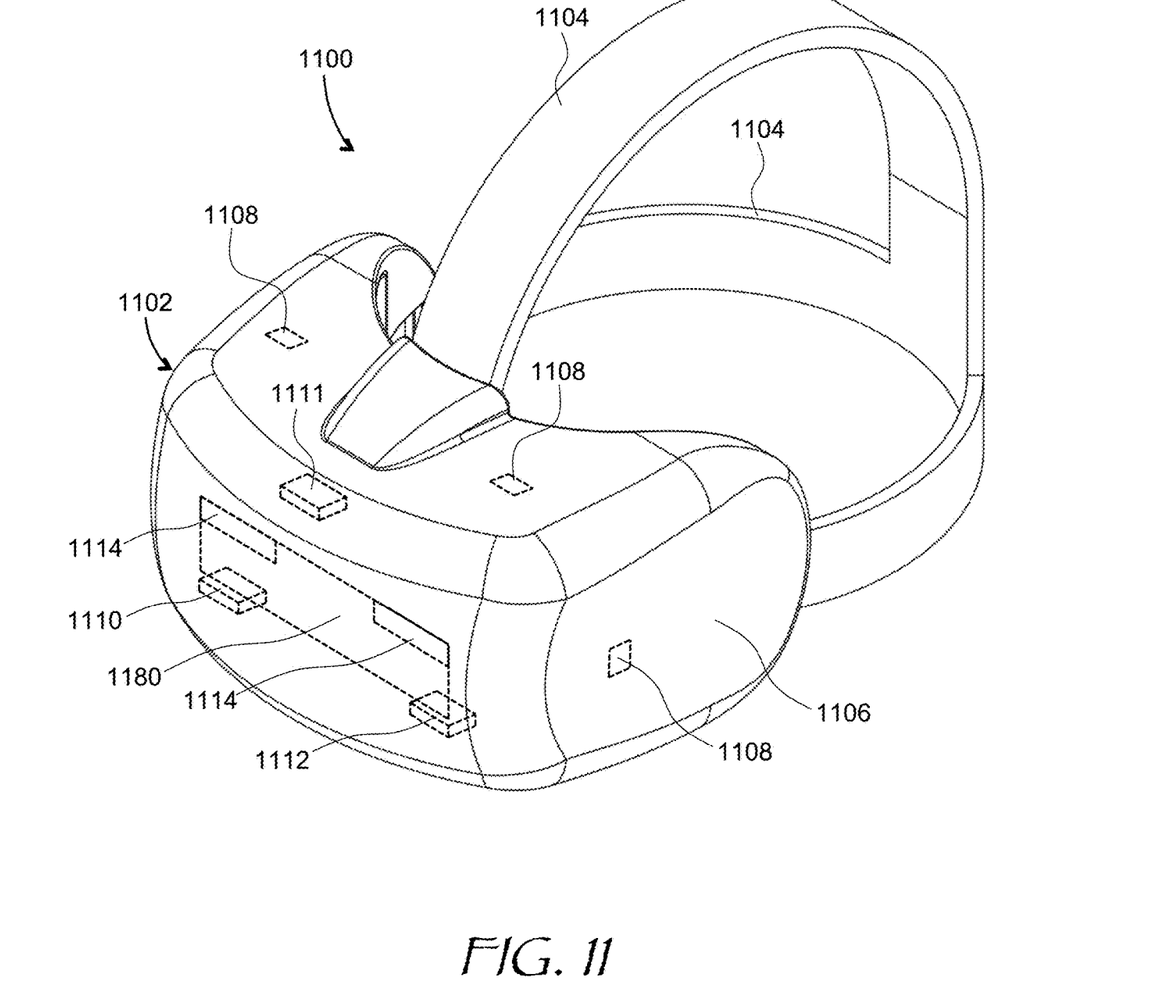
FIG. 11 is a three-dimensional view of a head-mounted display (HMD) of this disclosure.

Turning to FIG. 11, an HMD 1100 is an example of an AR/VR wearable display system which encloses the user's face, for a greater degree of immersion into the AR/VR environment. The HMD 1100 may generate the entirely virtual 3D imagery. The HMD 1100 may include a front body 1102 and a band 1104 that can be secured around the user's head. The front body 1102 is configured for placement in front of eyes of a user in a reliable and comfortable manner. A display system 1180 may be disposed in the front body 1102 for presenting AR/VR imagery to the user. The display system 1180 may include the optical assemblies and imaging systems disclosed herein. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The eye tracking system 1114 may include any of the eye imagers/eye tracking systems disclosed herein. The obtained position and orientation of the eyes also allows the HMD 1100 to determine the gaze direction of the user and to adjust the image generated by the display system 1180 accordingly. The determined gaze direction and vergence angle may be used to adjust the display system 1180 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A transmissive optical element for redirecting a light beam in a first wavelength range while transmitting light without redirection by diffraction in a second wavelength range, different from the first wavelength range, and within an angular range, the transmissive optical element comprising:
a first outer surface for receiving the light beam at a first beam angle;
a second outer surface opposing the first outer surface, for outputting the light beam through at a second, different beam angle;
a first volumetric grating between the first and second outer surfaces for redirecting, by reflective diffraction, the light beam propagated through the first outer surface; and
a second volumetric grating between the first and second outer surfaces for transmitting the light beam propagated through the first outer surface, for receiving the light beam redirected by the first volumetric grating, and for redirecting, by reflective diffraction, the light beam to propagate through the first volumetric grating, through the second outer surface, and out of the transmissive optical element at the second beam angle.

2. The transmissive optical element of claim 1 for use in a visual display, wherein the angular range comprises a field of view of the visual display.

3. The transmissive optical element of claim 2, wherein the field of view is at least +/−15 degrees in each one of vertical and horizontal directions.

4. The transmissive optical element of claim 1, wherein the first wavelength range is an infrared wavelength range comprising wavelengths greater than 710 nm, and the second wavelength range is a visible wavelength range comprising wavelengths between 390 nm and 710 nm.

5. The transmissive optical element of claim 1, wherein the first volumetric grating is disposed proximate the second outer surface, and the second volumetric grating is disposed proximate the first outer surface.

6. The transmissive optical element of claim 1, wherein the first and second volumetric gratings overlap within the transmissive optical element.

7. The transmissive optical element of claim 1, comprising an even number of volumetric gratings including the first and second volumetric gratings, for redirecting the light beam within the transmissive optical element by reflective diffraction.

8. The transmissive optical element of claim 1, wherein at least one of the first and second volumetric gratings comprises a volume Bragg grating.

9. The transmissive optical element of claim 1, wherein at least one of the first and second volumetric gratings has at least one of a spatially varying pitch or a spatially varying fringe slant angle to provide a spatially varying angle of redirection of the light beam by the transmissive optical element.

10. A near-eye display comprising:
a display module for providing image light to an eyebox; and
a transmissive optical element in an optical path of the image light for redirecting an infrared light beam while transmitting the image light to the eyebox, the transmissive optical element comprising:
a first outer surface for receiving the infrared light beam at a first beam angle;
a second outer surface opposing the first outer surface, for outputting the infrared light beam through at a second beam angle, different from the first beam angle;
a first volumetric grating between the first and second outer surfaces for redirecting, by reflective diffraction, the infrared light beam propagated through the first outer surface; and
a second volumetric grating between the first and second outer surfaces for transmitting the infrared light beam propagated through the first outer surface, for receiving the infrared light beam redirected by the first volumetric grating and for redirecting, by reflective diffraction, the infrared light beam to propagate through the first volumetric grating, through the second outer surface, and out of the transmissive optical element at the second beam angle.

11. The near-eye display of claim 10, wherein the first outer surface of the transmissive optical element faces the eyebox, and wherein the infrared light beam carries an image of a viewer's eye at the eyebox, the near-eye display further comprising an eye imager for imaging the viewer's eye, wherein the transmissive optical element is configured to redirect the infrared light beam to impinge onto the eye imager to detect the image of the viewer's eye.

12. The near-eye display of claim 11, wherein the infrared light beam comprises wavelengths greater than 710 nm, and wherein the image light is within a wavelength range between 390 nm and 710 nm.

13. The near-eye display of claim 10, wherein the first volumetric grating is disposed proximate the second outer surface, and the second volumetric grating is disposed proximate the first outer surface.

14. The near-eye display of claim 10, wherein the first and second volumetric gratings overlap within the transmissive optical element.

15. The near-eye display of claim 10, comprising an even number of volumetric gratings including the first and second volumetric gratings, for redirecting the infrared light beam within the transmissive optical element by reflective diffraction.

16. The near-eye display of claim 10, wherein at least one of the first and second volumetric gratings comprises a volume Bragg grating.

17. A method for imaging a viewer's eye in a near-eye display, the method comprising:
illuminating the viewer's eye with auxiliary light;
redirecting the auxiliary light reflected from the viewer's eye using a transmissive optical element in an optical path of image light carrying images to be viewed by the viewer's eye, the redirecting comprising:
redirecting the auxiliary light by reflective diffraction on a first volumetric grating of the transmissive optical element; and
redirecting the auxiliary light redirected by the first volumetric grating by reflective diffraction on a second volumetric grating of the transmissive optical element to propagate through the first volumetric grating and exit the transmissive optical element; and detecting the auxiliary light redirected by the transmissive optical element to obtain an image of the viewer's eye;

wherein at least one of the first and second volumetric gratings comprises a polarization volume hologram grating configured to selectively redirect light of a first polarization state while substantially transmitting light of a second, orthogonal polarization state.

18. The method of claim 17, wherein the transmissive optical element redirects the auxiliary light away from the optical path of the image light.

19. The method of claim 17, wherein the transmissive optical element is configured to substantially not deviate or absorb the image light.

20. The method of claim 19, wherein the image light provides a field of view of at least +/−15 degrees in each one of vertical and horizontal directions.

* * * * *